United States Patent
Qin

(10) Patent No.: US 12,531,714 B2
(45) Date of Patent: Jan. 20, 2026

(54) MEMORY SYSTEMS, SYSTEMS AND OPERATING METHODS THEREOF, COMPUTER-READABLE STORAGE MEDIUMS

(71) Applicant: Yangtze Memory Technologies Co., Ltd., Hubei (CN)

(72) Inventor: Lingjun Qin, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/404,670

(22) Filed: Jan. 4, 2024

(65) Prior Publication Data
US 2025/0094049 A1    Mar. 20, 2025

(30) Foreign Application Priority Data
Sep. 14, 2023    (CN) .......................... 202311190444.1

(51) Int. Cl.
  *G06F 13/42*  (2006.01)
  *G06F 13/16*  (2006.01)
  *H04L 5/14*   (2006.01)
(52) U.S. Cl.
  CPC ........ *H04L 5/1438* (2013.01); *G06F 13/1689* (2013.01); *G06F 13/4282* (2013.01); *G06F 2213/0026* (2013.01)
(58) Field of Classification Search
  CPC ............... H04L 5/1438; G06F 13/1689; G06F 13/4282; G06F 2213/0026
  See application file for complete search history.

(56) References Cited

U.S. PATENT DOCUMENTS

| 11,863,357 | B2 * | 1/2024 | McLoughlin ....... G06F 13/4282 |
| 2021/0089385 | A1 * | 3/2021 | Basuta ..................... G06F 12/10 |
| 2023/0281080 | A1 * | 9/2023 | Wu ..................... G06F 11/1415 |
| | | | 714/43 |

FOREIGN PATENT DOCUMENTS

| CN | 111512606 A | 8/2020 |
| CN | 113568565 A | 10/2021 |

(Continued)

OTHER PUBLICATIONS

State Intellectual Property Office of People's Republic of China, "First Examination Opinion Notice," issued in connection with China Patent Application No. 202311190444.1, mailed on Aug. 6, 2025, 16 pages. [English language machine translation included.]

*Primary Examiner* — Bryce P Bonzo
*Assistant Examiner* — Audrey Emma Whitesell
(74) *Attorney, Agent, or Firm* — HANLEY, FLIGHT & ZIMMERMAN, LLC

(57) ABSTRACT

The present disclosure provides example memory systems and operating methods thereof, systems and operating methods thereof, and computer-readable storage mediums. An example memory system includes an interface and an interface controller, the interface is connected to a host through a link; the interface controller is configured to: determine whether link equalization is to be redone based on a temperature change of the memory system and error counts of the interface; the error counts include a first error count and a second error count, and the first error count is a number of recoverable errors in data packets received by the interface, and the second error count is a number of times that the interface switches between a normal operating state and a recovery state; in response to the link equalization being to be redone, trigger the link equalization.

20 Claims, 12 Drawing Sheets

(56) References Cited

FOREIGN PATENT DOCUMENTS

| CN | 115622846 A | 1/2023 |
|---|---|---|
| CN | 115904772 A | 4/2023 |

\* cited by examiner

MEMORY SYSTEMS, SYSTEMS AND OPERATING METHODS THEREOF, COMPUTER-READABLE STORAGE MEDIUMS

CROSS-REFERENCE TO RELATED APPLICATIONS

The present application claims the benefit of priority to China Application No. 202311190444.1, filed on Sep. 14, 2023, the content of which is incorporated herein by reference in its entirety.

FIELD OF TECHNOLOGY

The present disclosure relates to the field of semiconductor technology, and in examples to a memory system and operating method thereof, a system and operating method thereof, and computer-readable storage medium.

BACKGROUND

In a system including a host and a memory system, the host and the memory system communicate according to a communication protocol, the host and the memory system are connected through a link, and the two ends of the link are the interface at the side of the host and the interface at the side of the memory system.

DETAILED DESCRIPTION

Figure 1:
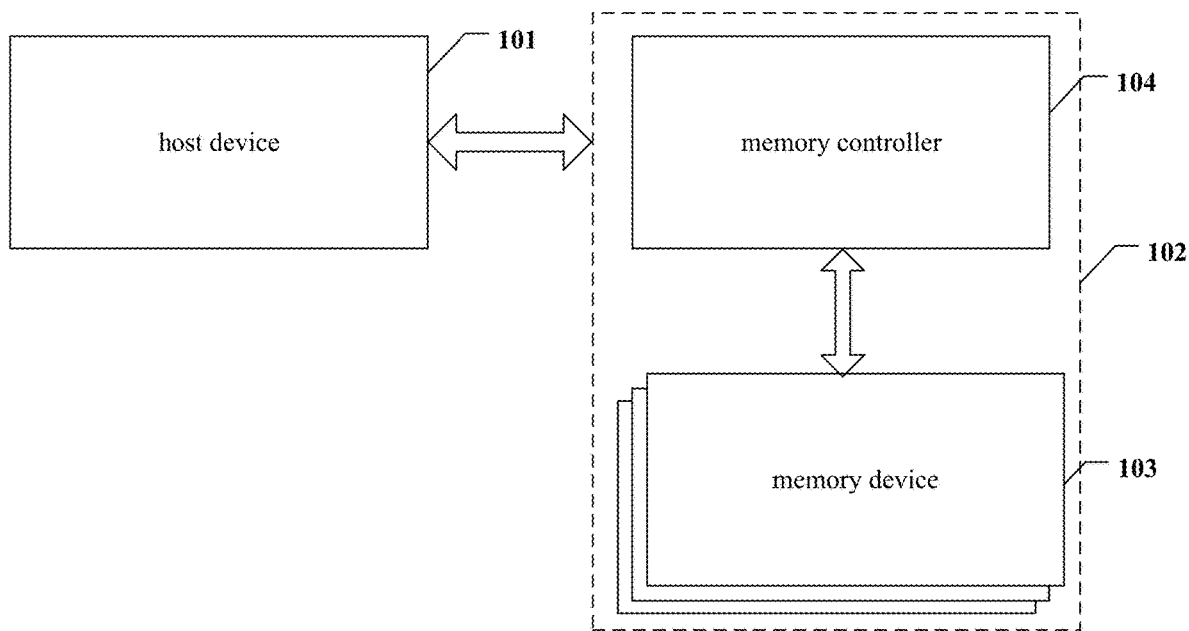
FIG. 1 is a schematic diagram of an example system having a memory system provided by an example of the present disclosure.

Examples of the present disclosure will be described in more detail below with reference to the accompanying drawings. Although example implementations of the present disclosure are shown in the accompanying drawings, it should be understood that the present disclosure may be implemented in various forms and should not be limited to the implementations set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. However, it will be apparent to one skilled in the art that the present disclosure may be practiced without one or more of these details. In other examples, in order to avoid confusion with the present disclosure, some technical features known in the art are not described; that is, not all features of the actual example are described here, and well-known functions and structures are not described in detail.

In the appended drawings, like reference numerals refer to like elements throughout.

It should be understood that the spatially relative terms such as "beneath", "below", "lower", "under", "above", "on", etc., may be used herein for case of description to describe one element or feature's relationship to another element(s) or feature(s) as illustrated in the appended drawings. It will be understood that the spatially relative terms are intended to encompass different orientations of the device in use or operations in addition to the orientation depicted in the figures. For example, if the device in the appended drawings is turned over, an element or a feature described as "below" or "beneath" or "under" another element or feature would then be oriented "above" the another element or feature. Thus, example terms "below" and "under" may encompass both directions of up and down. A device may be otherwise oriented (rotated 90 degrees or at other orientations) and the spatially descriptive terms used herein should be interpreted accordingly.

A term used herein is for the purpose of describing a particular example only and is not to be considered as limitation of the present disclosure. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, steps, operations, elements and/or parts, but do not exclude the presence or addition of one or more other features, integers, steps, operations, elements, parts and/or groups. As used herein, the term "and/or" includes any and all combinations of the associated listed items.

In order to understand the characteristics and technical content of examples of the present disclosure in more detail, implementations of examples of the present disclosure will be described in detail below in conjunction with the accompanying drawings, however, the accompanying drawings are for reference and description only, and are not intended to limit examples of the present disclosure.

A memory system in an example of the present disclosure includes, but is not limited to, a memory system including a three-dimensional NAND memory, and for case of understanding, a memory system provided by the present disclosure will be described by taking a memory system including a three-dimensional NAND memory as an example.

When the link enters an unstable state, a certain recovery mechanism may be employed to make the link re-enter to a stable operating state. However, the link recovery mechanism in related technologies is still to be optimized.

FIG. 1 is a schematic diagram of an example system with a memory system provided by an example of the present disclosure. In an example of the present disclosure, the system 100 may be a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having a memory therein. As shown in in FIG. 1, the system 100 may include a host device 101 and a memory system 102, and the memory system 102 may include one or more memory devices 103 and a memory controller 104. The host device 101 may include a processor of an electronic device, e.g., a Central Processing Unit (CPU)) or a System on Chip (SoC), e.g., an Application Processor (AP). The host device 101 may be configured to send data to or receive data from the memory system 102.

In some implementations, the memory controller 104 is coupled to the memory device 103 and the host device 101 and is configured to control the memory device 103. The memory controller 104 may manage data stored in the memory device 103 and communicate with the host device 101. In some implementations, the memory controller 104 is designed to be used to operate in low duty cycle environments, e.g., to operate in Secure Digital Memory Card (SD Card), Compact Flash Card (CFC), Universal Serial Bus (USB) flash drive, or used to operate in other medium for use in electronic devices such as personal computer, digital camera, mobile phone, etc. In some other implementations, the memory controller 104 is designed to be used to operate in high duty cycle environments, e.g., to operate in Solid State Drive (SSD) or Embedded Multi Medium Card (eMMC).

In some examples, the memory controller 104 and one or more memory devices 103 may be integrated into various types of storage devices, i.e., the memory system 102 may be implemented and packaged into different types of terminal electronic products.

Figure 2:
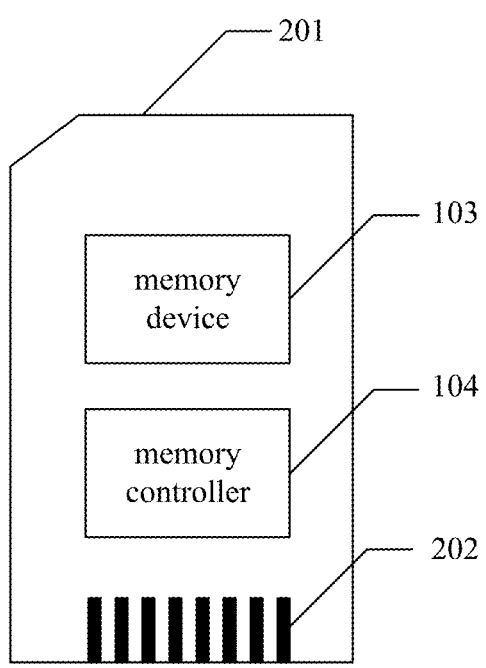
FIG. 2 is a schematic diagram of an example memory card having a memory system provided by an example of the present disclosure.
Figure 3:
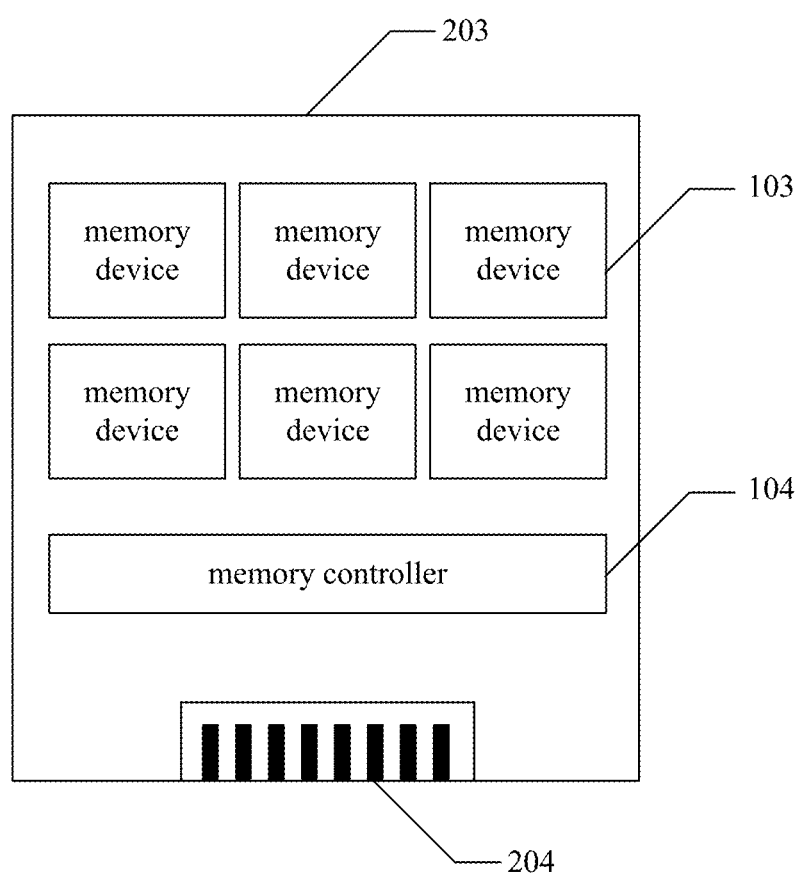
FIG. 3 is a schematic diagram of an example solid state drive having a memory system provided by an example of the present disclosure.

In an example as shown in FIG. 2, memory controller 104 and a single memory device 103 may be integrated into a memory card 201. The memory card 201 may be one of a Compact Flash Card, Smart Medium Card (SMC), Memory Stick (MS), Multi-Medium Card (MMC) (e.g., RS-MMC, MMCmicro, eMMC, etc.), a secure digital card (e.g., Mini SD card, Micro SD card, SDHC card, etc.), Universal Flash Storage (UFS) card. The memory card 201 may further include a memory card connector 202 coupling the memory card 201 with a host device (e.g., the host device 101 in FIG. 1). In another example as shown in FIG. 3, the memory controller 104 and multiple memory devices 103 may be integrated into SSD203. SSD203 may further include an SSD connector 204 coupling the SSD203 with a host device (e.g., the host device 101 in FIG. 1). In some implementations, the storage capacity and/or operating speed of SSD203 is greater than the storage capacity and/or operating speed of memory card 201.

Figure 4:
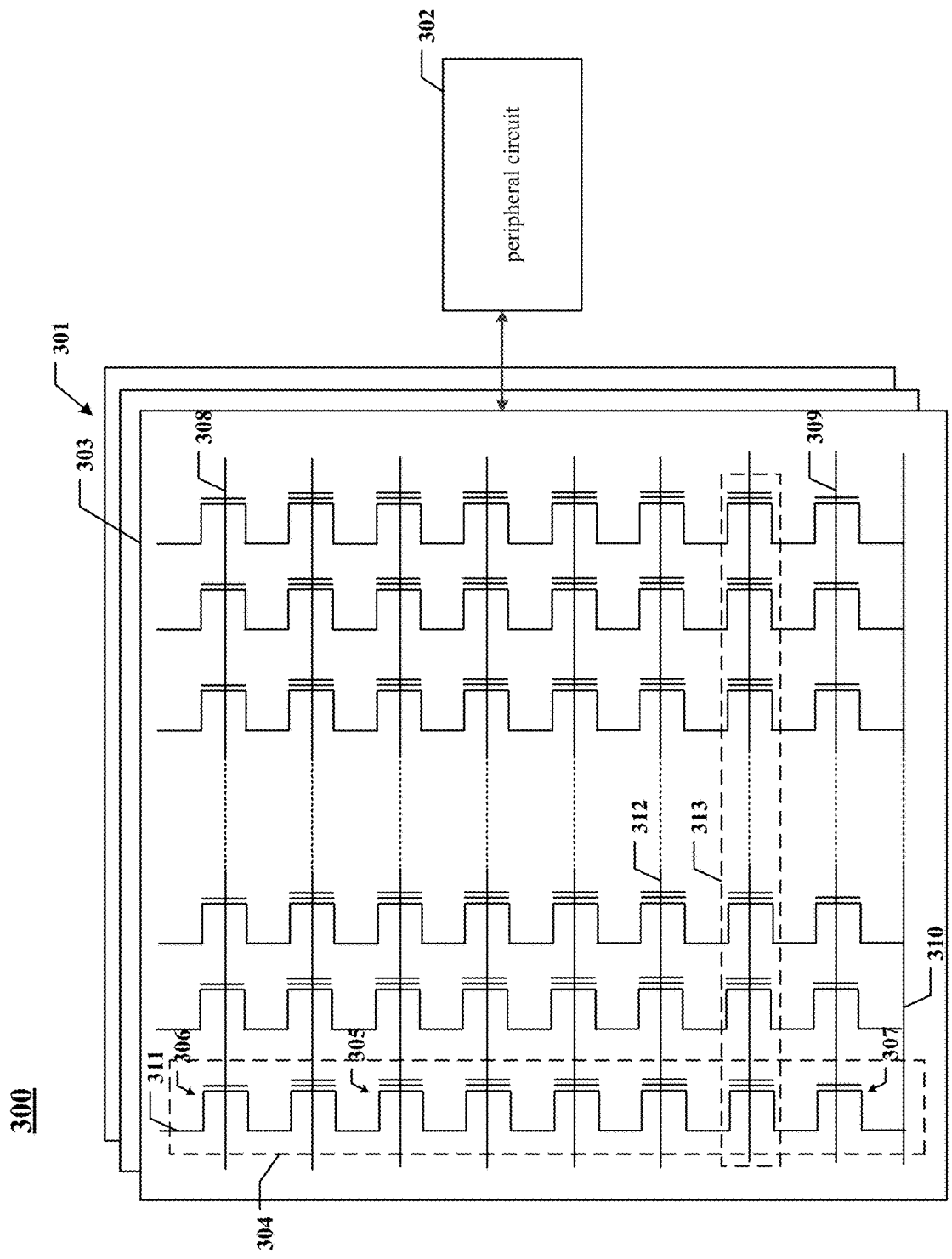
FIG. 4 is a schematic diagram of an example memory device including a peripheral circuit provided by an example of the present disclosure.

FIG. 4 is a circuit schematic diagram of an example memory device 300 including a peripheral circuit provided by an example of the present disclosure. Memory device 300 may be an example of memory device 103 in FIG. 1. The memory device 300 may include a memory array 301 and peripheral circuit 302 coupled to the memory array 301. Taking memory array 301 being a three-dimensional NAND memory array as an example for description, where memory cells 305 is a NAND memory cell, and memory cells 305 are provided in the form of an array of memory strings 304, each memory string 304 extending vertically over a substrate (not shown). In some implementations, each memory string 304 includes multiple memory cells 305 coupled in series and stacked vertically. Each memory cell 305 may retain a continuous analog value, e.g., voltage or charge, depending on the number of electrons trapped within the area of the memory cell 305. Each memory cell 305 may be a "floating gate" type memory cell including a floating gate transistor, or a "charge trap" type memory cell including a charge trap transistor.

In some implementations, each memory cell 305 is a Single Level Cell (SLC) that has two possible memory states and may thus store one bit of data. For example, a first memory state of "0" may correspond to a first voltage range, and a second memory state of "1" may correspond to a second voltage range. In some examples, each memory cell 305 is a multi-level cell capable of storing more than a single bit of data in four or more memory states, e.g., a Multi-Level Cell (MLC) storing two bits per cell, a Triple Level Cell (TLC) storing three bits per cell, or a Quad-Level Cell (QLC) storing four bits per cell.

As shown in FIG. 4, each memory string 304 may include a bottom select transistor (BST) 307 at its source terminal and a top select transistor (TST) 306 at its drain terminal. The bottom select transistor 307 and the top select transistor 306 may be configured to activate a selected memory string 304 during read operation and program operation. In some implementations, sources of the memory strings 304 in a same memory block 303 are coupled through a Common Source Line (CSL) 310. In other words, all memory strings 304 in a same memory block 303 have an Array Common Source (ACS). According to some implementations, the top select transistor 306 of each memory string 304 is coupled to a corresponding bit line (BL) 311 from which data may be read or written via an output bus (not shown). In some implementations, each memory string 304 is configured to be selected or deselected through a selection voltage (e.g., a voltage higher than the threshold voltage of the top select transistor 306) or a deselection voltage (e.g., 0V) being applied to the corresponding top select transistor 306 via one or more top select lines (TSL) 308 and/or a selection voltage (e.g., a voltage higher than the threshold voltage of the bottom select transistor 307) or a deselection voltage (e.g., 0V) being applied to the corresponding bottom select transistor 307 via one or more bottom select lines (BSL) 309.

As shown in FIG. 4, the memory string 304 may be organized into multiple memory blocks 303, each of which may have a common source line 310. In some implementations, each memory block 303 is the basic data unit for an erase operation, i.e., all memory cells 305 on the same memory block 303 are erased simultaneously. To erase the memory cell 305 in the selected memory block, source line 310 coupled to selected memory block and to unselected memory blocks in the same plane as selected memory block may be biased with an erase voltage. It should be understood that, in some examples, erase operations may be performed at the half-memory block level, at the quarter-memory block level, or at a level with any suitable number of memory blocks or any suitable fraction of memory blocks. Memory cells 305 of adjacent memory strings 304 may be coupled through a word line 312 that selects which row of memory cells 305 is affected by read operation or program operation. In some implementations, each word line 312 is coupled to a memory page 313. The size of one memory page 313 in bits may be related to the number of memory strings 304 coupled through word line 312 in a memory block 303. Each word line 312 may include multiple control gates at each memory cell 305 in a corresponding memory page 313 and a gate line coupling the control gates.

Figure 5:
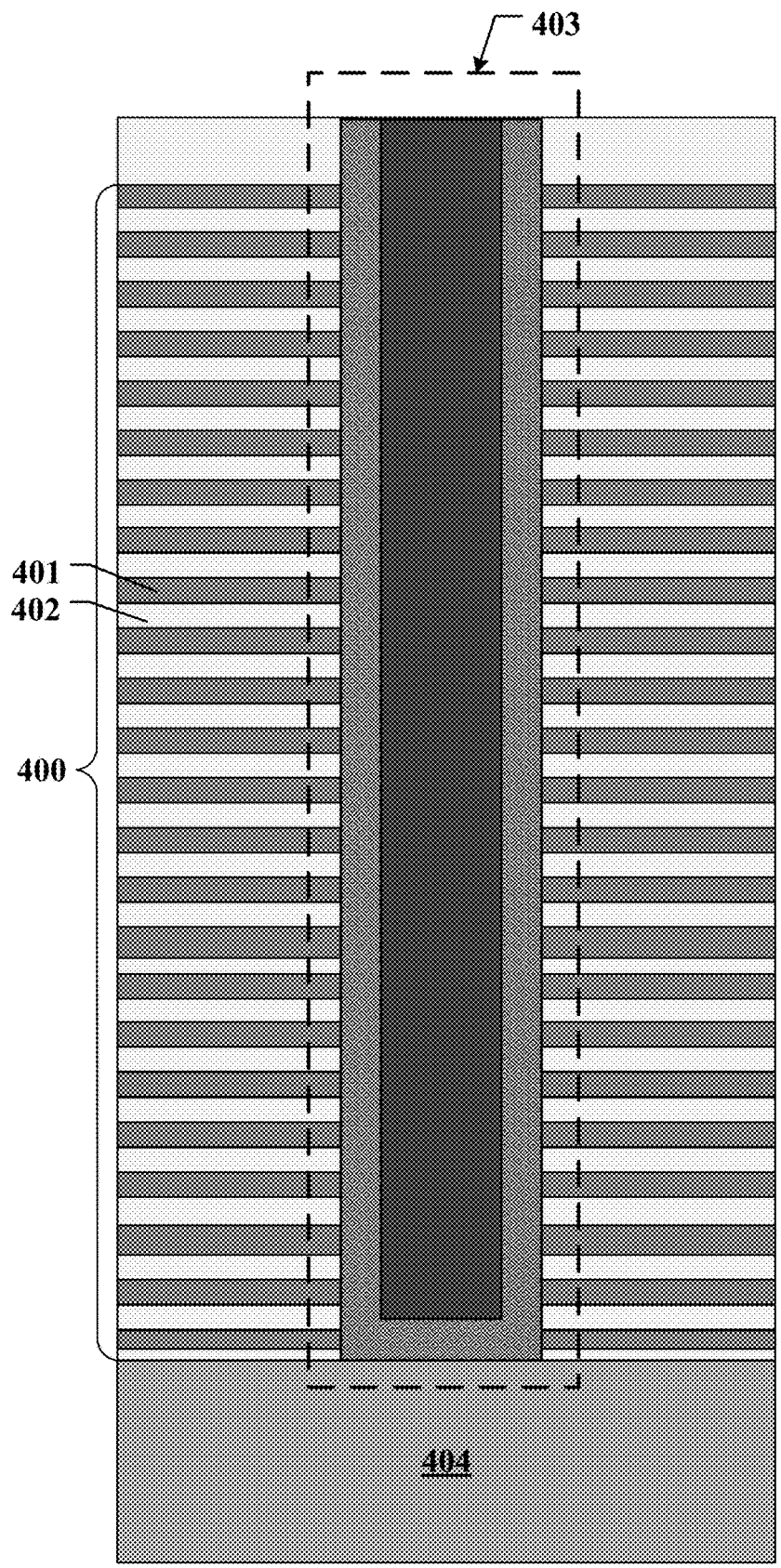
FIG. 5 is a schematic cross-sectional view of a memory array including memory strings provided by an example of the present disclosure.

FIG. 5 is a schematic cross-sectional view of a memory array including memory strings provided by an example of the present disclosure. As shown in FIG. 5, the memory array may include a stacked structure 400, the stacked structure 400 includes multiple gate layers 401 and multiple insulating layers 402 alternately stacked in sequence, and the channel structure 403 vertically penetrating through the gate layers 401 and the insulating layers 402. The gate layers 401 and the insulating layers 402 may be stacked alternately, and two adjacent gate layers 401 are separated by an insulating layer 402. The number of memory cells included in the memory array is mainly related to the number of pairs of gate layers 401 and insulating layers 402 in the stacked structure 400.

A constituent material of the gate layer 401 may include a conductive material. Conductive materials include, but are not limited to, tungsten (W), cobalt (Co), copper (Cu), aluminum (Al), polysilicon, doped silicon, silicide, or any combination thereof. In some examples, each gate layer 401 includes a metal layer, e.g., a tungsten layer. In some examples, each gate layer 401 includes a doped polysilicon layer. Multiple gate layers 401 surround a channel structure 403 to form a memory string. A gate layer 401 at the top of a stacked structure 400 may extend laterally as an upper selection gate line, a gate layer 401 at the bottom of a stacked structure 400 may extend laterally as a lower selection gate line, and a gate layer 401 extending laterally between a upper selection gate line and a lower selection gate line may serve as a word line layer.

In some examples, a stacked structure 400 may be disposed on a substrate 404. The substrate 404 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some implementations, the channel structure 403 includes a functional layer, a channel layer, and an insulating fill layer. In some implementations, the channel layer includes silicon, e.g., polysilicon. In some implementations, the functional layer is a composite dielectric layer including a tunneling layer, a storage layer (also referred to as a "charge trapping/storage layer"), and a blocking layer. The channel structure 403 may have a cylindrical shape (e.g., a pillar shape). According to some implementations, a channel layer, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A blocking layer may include silicon oxide, silicon oxynitride, a high-k (high-k) dielectric, or any combination thereof. In an example, the functional layer may include a composite layer of silicon oxide/silicon oxynitride/silicon oxide (ONO).

Figure 6:
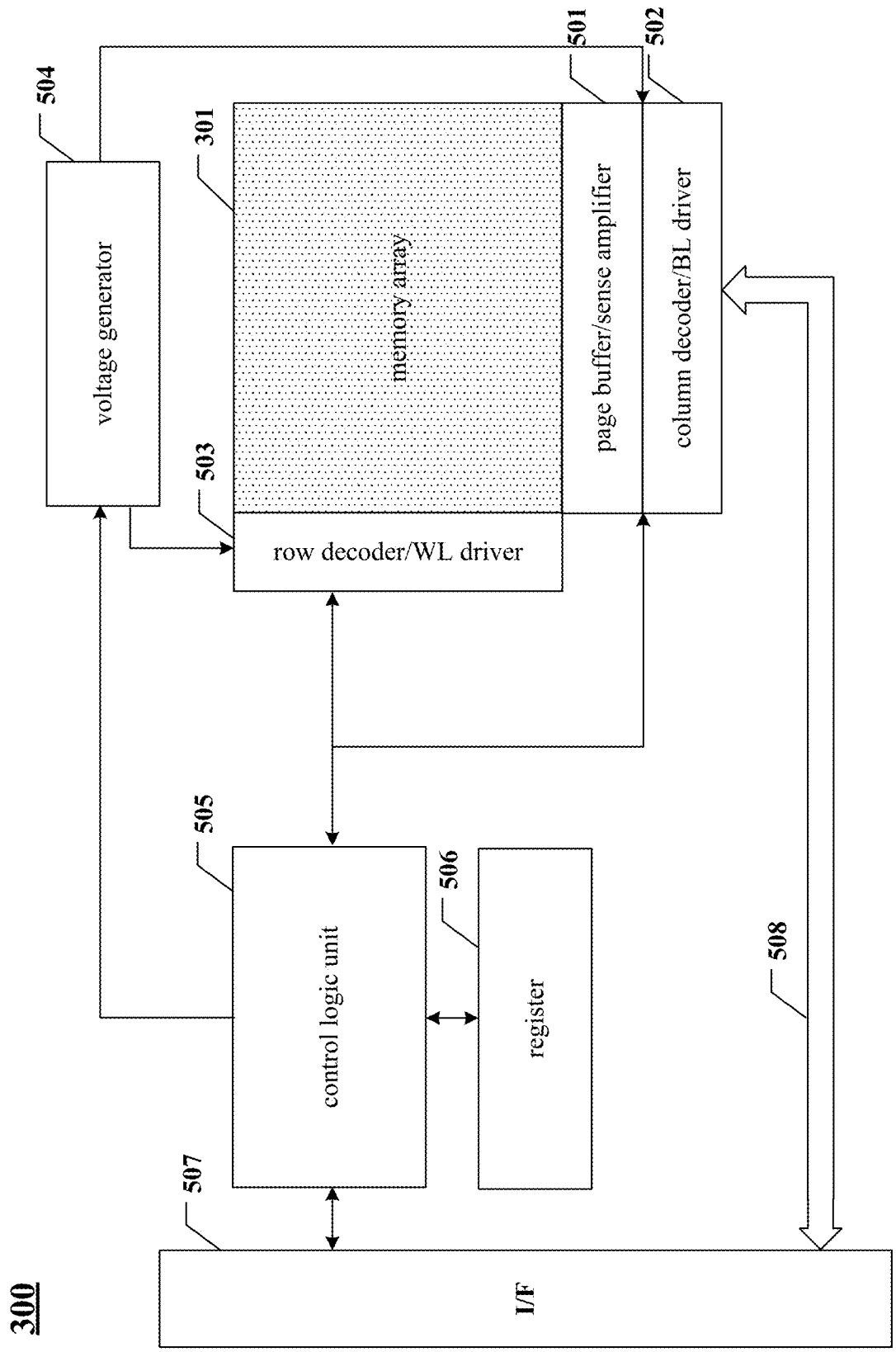
FIG. 6 is a schematic diagram of an example memory device including a memory array and peripheral circuits provided by an example of the present disclosure.

Referring back to FIG. 4, peripheral circuit 302 may be coupled to memory array 301 through the bit line 311, word line 312, common source line 310, bottom select line 309, and top select line 308. The peripheral circuit 302 may include any suitable analog, digital, and mixed-signal circuitry for implementing operation of the memory array 301 through applying a voltage signal and/or a current signal to and sensing voltage signal and/or current signal from each target memory cell 305 via bit line 311, word line 312, source line 310, bottom select line 309, and top select line 308. The peripheral circuit 302 may include various types of peripheral circuits formed with metal-oxide-semiconductor technology. For example, FIG. 6 illustrates some example peripheral circuits, peripheral circuit 302 includes page buffer/sense amplifier 501, column decoder/bit line driver 502, row decoder/word line driver 503, voltage generator 504, control logic unit 505, register 506, flash memory interface 507 and data bus 508. It should be understood that in some examples, additional peripheral circuits not shown in FIG. 6 may also be included.

The page buffer/sense amplifier 501 may be configured to read data from and program (write) data to the memory array 301 according to control signals from the control logic unit 505. In one example, the page buffer/sense amplifier 501 may store a page of programming data (written data) to be programmed into the memory array 301. In another example, page buffer/sense amplifier 501 may perform a programming verify operation to ensure that data has been correctly programmed into memory cell coupled to selected word line. In yet another example, page buffer/sense amplifier 501 may also sense a low power signal from bit line representing a data bit stored in memory cell and amplify a small voltage swing to a recognizable logic level during a read operation. The column decoder/bit line driver 502 may be configured to be controlled by control logic unit 505 and to select one or more memory strings through applying a bit line voltage generated from voltage generator 504.

The row decoder/word line driver 503 may be configured to be controlled by control logic unit 505 and select/deselect memory block of memory array 301 and select/deselect word line of memory block. The row decoder/word line driver 503 may also be configured to drive word line with a word line voltage generated from the voltage generator 504. In some implementations, the row decoder/word line driver 503 may also select/deselect and drive the bottom select line and top select line. As described in detail below, the row decoder/word line driver 503 is configured to perform programming operations on the memory cells coupled to the selected word line. The voltage generator 504 may be configured to be controlled by the control logic unit 505, and generate word line voltage (e.g., read voltage, programming voltage, pass voltage, local voltage, verify voltage, etc.), bit line voltage and source line voltage to be supplied to the memory array 301.

Control logic unit 505 may be coupled to each of the peripheral circuits described above and configured to control operations of each of the peripheral circuits. Register 506 may be coupled to the control logic unit 505 and include state register, command register and address register for storing state information, command operation code (OP code) and command address for controlling operations of each of the peripheral circuits. The flash memory interface 507 may be coupled to control logic unit 505 and act as a control buffer to buffer and relay control commands received from a host device (not shown) to control logic unit 505 and to buffer and relay state information received from the control logic unit 505 to the memory controller. The flash memory interface 507 may also be coupled to column decoder/bit line driver 502 via data bus 508 and act as a data I/O interface and data buffer to buffer and relay data to/from memory array 301.

Figure 7:
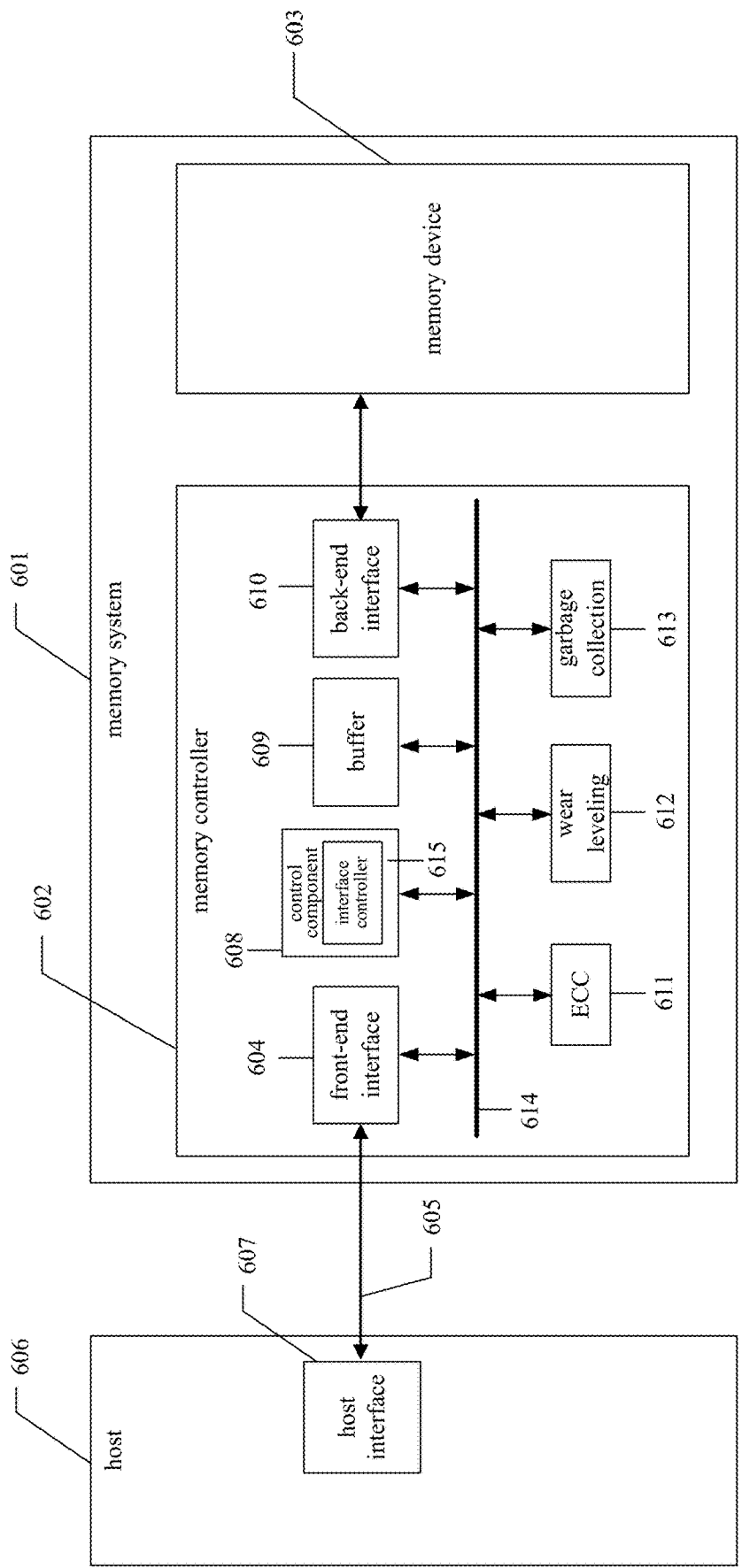
FIG. 7 is a schematic diagram of a system including an interface and a host interface provided by an example of the present disclosure.

FIG. 7 is a schematic diagram of a system including a host and a memory system provided by an example of the present disclosure, As shown in FIG. 7, the system includes a memory system 601, the memory system 601 includes a memory controller 602 and a memory device 603, here, the memory device 603 may include at least one memory device 300 from any of the previous examples. The memory controller 602 includes a control component 608, a buffer 609, an Error Checking and Correcting (ECC) module 611, a front-end interface 604, a back-end interface 610, a Wear Leveling (WL) module 612, and a Garbage Collection (GC) module 613. The control component 608 is coupled with other modules through the bus 614 and is configured to control the memory system 601 as a whole, the control component 608 is, e.g., a Central Processing Unit (CPU), a Micro Processor Unit (MPU), etc. The memory controller 602 is coupled to the host 606 through a front-end interface 604 and coupled to the memory device 603 through a back-end interface 610. The memory controller 602 is configured to manage data stored or to be stored in the memory device 603 through wear leveling and garbage collection, the memory controller 602 is also configured to perform error correction on data read from memory device 603 or data to be written into memory device 603.

In some examples, the memory controller 602 may communicate with a host 606 according to a particular communication protocol. The memory controller 602 may communicate with host 606 through at least one interface protocols, interface protocol including USB protocol, MMC protocol, Peripheral Component Interconnect (PCI) protocol, Peripheral Component Interconnect Express (PCIe) protocol, Serial Advanced Technology Attachment (SATA) protocol, Paralle Advanced Technology Attachment (PATA) protocol, Small Computer System Interface (SCSI) protocol, Enhanced System Device Interface (ESDI) protocol, Integrated Drive Electronics (IDE) protocol, etc.

In some examples, the front-end interface 604 of the memory system 601 is connected to the host interface 607 of the host 606 through a link 605, here, taking each of the front-end interface 604 and the host interface 607 being an interface of high-speed serial computer expansion bus standard as an example for description, i.e., both the front-end interface 604 and the host interface are PCIe interfaces, and the front-end interface 604 and the host interface 607 communicate according to PCIe protocol specifications to implement communication between the memory system 601 and the host 606.

According to the PCIe protocol specification, upon the system being powered on or reset, the Link Training and Status State Machine (LTSSM) control link 605 in the front-end interface 604 and the host interface 607 sequentially enters Detect, Polling, Configuration. In one example, in the detection stage, the front-end interface 604 and the host interface 607 detect whether the other party is in place, and enter the polling stage after determining that the other party is in place, and in the polling stage, perform bit and symbol locking and channel polarity determination, and then enter the configuration stage to perform link bandwidth and link number determination, and perform operations such as channel-to-channel phase compensation, etc. After completing the configuration, link 605 enters the Linkup state at a low rate (2.5 GT/S), and then enters the Recovery state in which link 605 will perform rate switch, switching from the lowest rate to the highest rate, when the rate switches to 8 GT/S and above, the Link Training and Status State Machine will enter the Equalization sub-state in the Recovery state in which the front-end interface 604 and the host interface 607 will perform link equalization, i.e., negotiating the equalization coefficient, and adjusting their respective transmission parameters (Tx) and reception parameters (Rx) to reduce the Bit Error Ratio (BER) of the data received at both ends of the link below the maximum bit error ratio specified by the protocol (e.g., 10E-12). After the first rate switch is completed and the link 605 can operate stably, it switches to a higher rate, and repeats the rate switch and link equalization process until the equalization parameters that meet the link stability requirements are obtained at each operating rate through negotiation. When link equalization has been completed at all operating rates supported by the interface, the link enters the normal operating state (L0), and the link 605 operates at the highest rate supported by the interface or perform data transmission at the highest rate that can meet link stability requirements.

However, the link equalization described above is performed at the temperature when the link enters the Linkup state, however, when the ambient temperature changes, the equalization parameters obtained through the link equalization negotiation described above may no longer be applicable, therefore causing the link to enter an unstable state and leading to a decrease in link performance.

In some examples, when a link enters an unstable state, the memory system needs to report to the host, and the host determines whether link equalization is to be redone (Redo Equalization) and triggers link equalization. However, when the host is connected to multiple memory systems and other PCIe devices at the same time, the determination of whether link equalization is to be redone and triggering link equalization will occupy the computing resources of the host, causing a decrease in the overall performance of the system.

Therefore, how to optimize the mechanism for triggering the link equalization has become an urgent problem to be solved. To this end, the present disclosure proposes the following examples.

Figure 8:
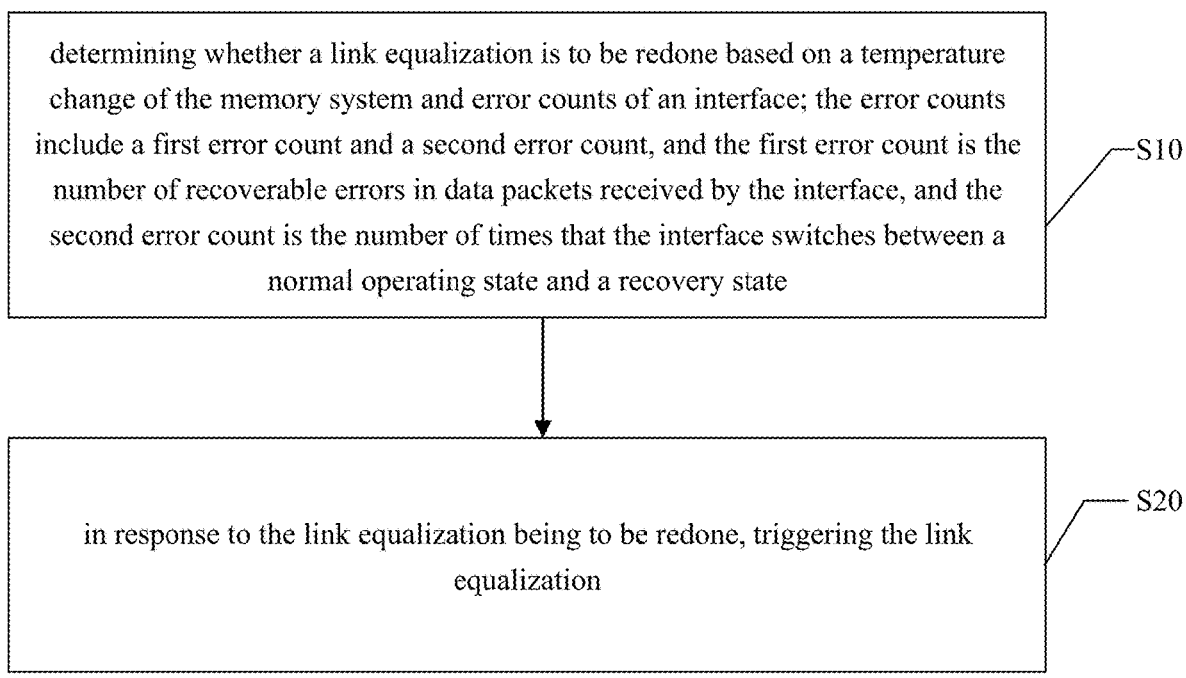
FIG. 8 is a schematic flowchart of an implementation of a method for operating a memory system provided by an example of the present disclosure.

An example of the present disclosure provides a method for operating a memory system, FIG. 8 is a schematic flowchart of an implementation of a method for operating a memory system provided by an example of the present disclosure, as shown in FIG. 8, the operation of the memory system includes the following operations:

S10: determining whether a link equalization is to be redone based on a temperature change of the memory system and error counts of an interface; the error counts include a first error count and a second error count, and the first error count is the number of recoverable errors in data packets received by the interface, and the second error count is the number of times that the interface switches between a normal operating state and a recovery state;

S20: in response to the link equalization being to be redone, triggering the link equalization.

Figure 9:
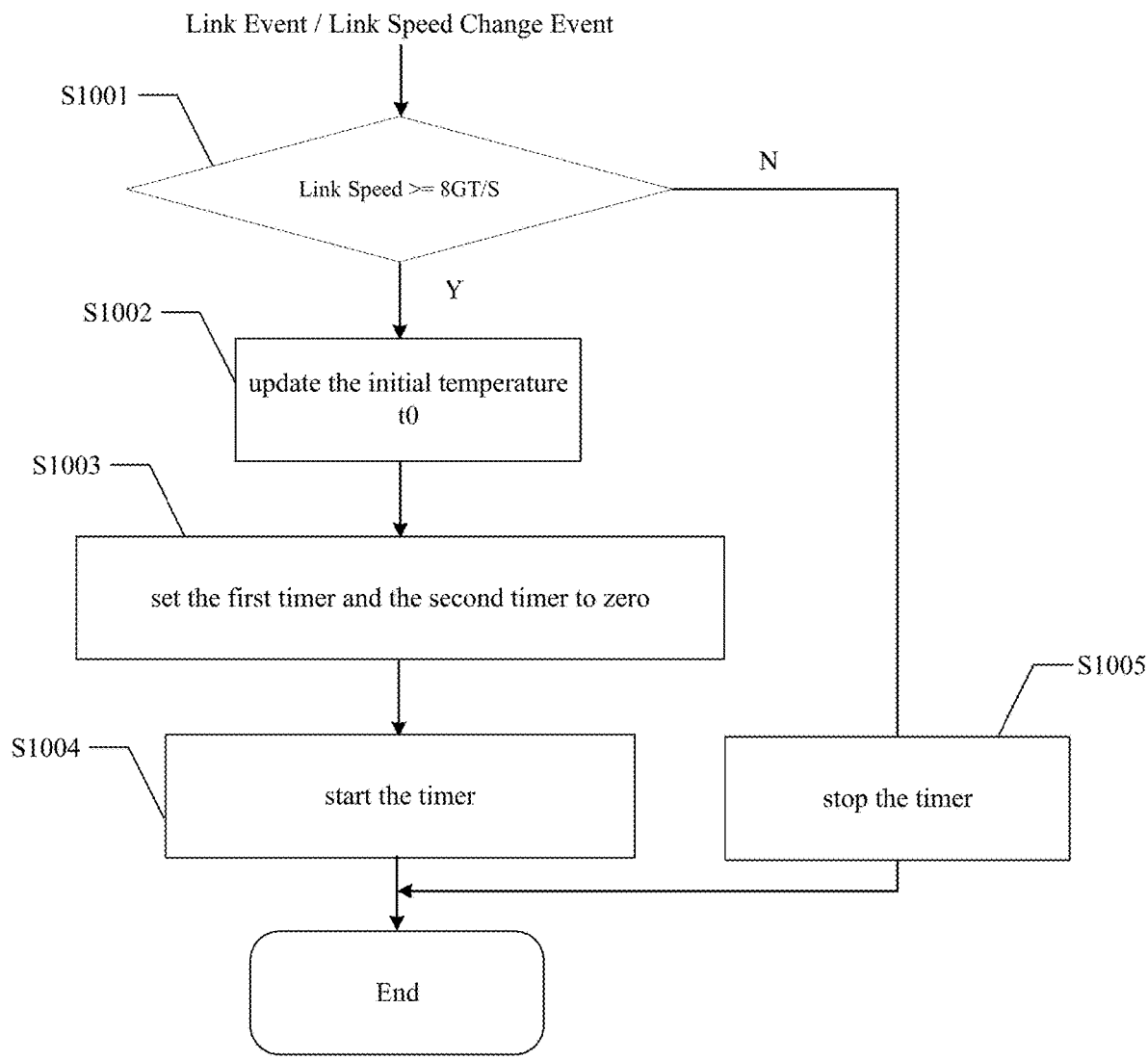
FIG. 9 is a schematic diagram of the framework flow of the method for operating a memory system provided by an example of the present disclosure.
Figure 10:
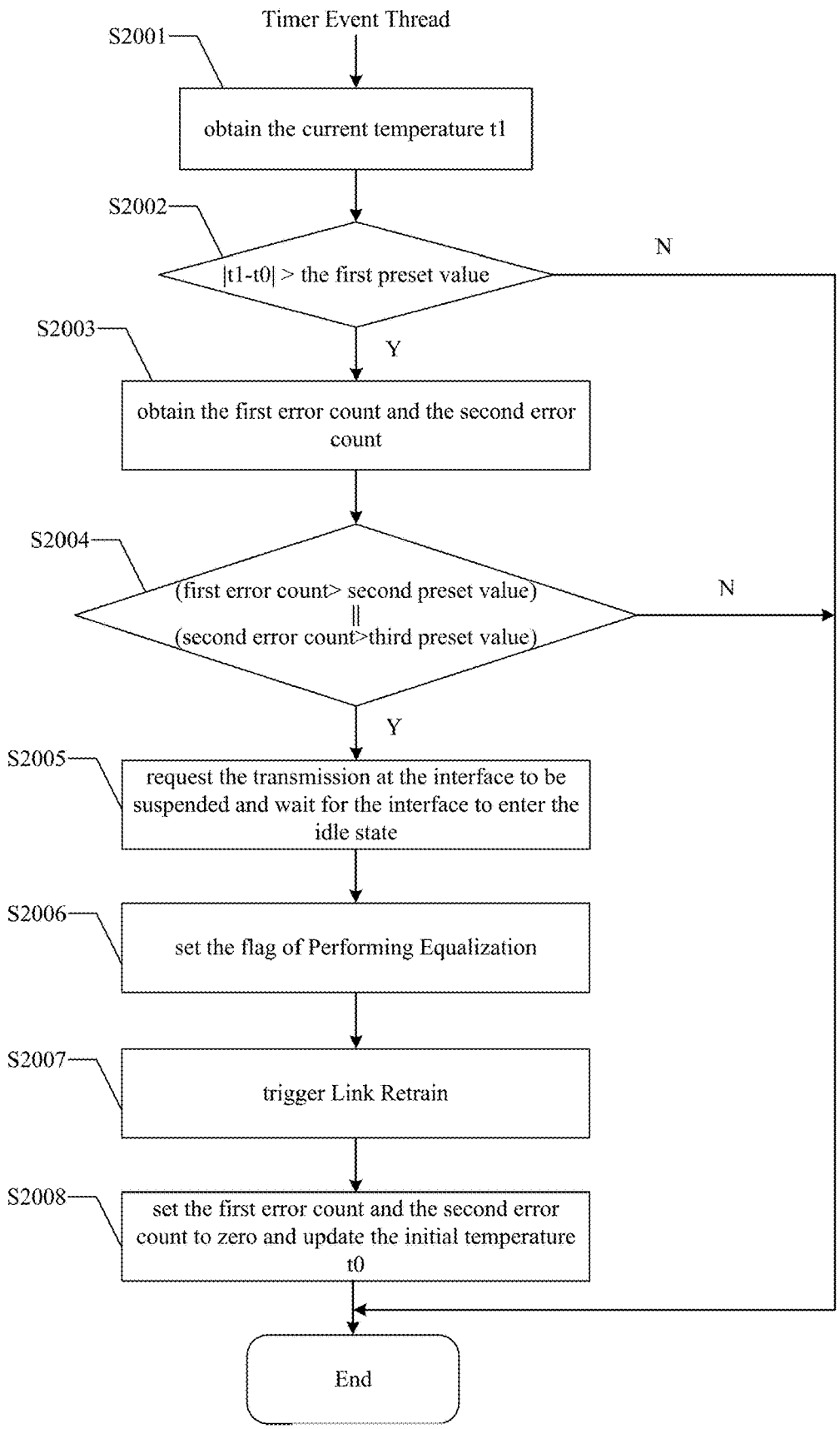
FIG. 10 is another schematic diagram of the framework flow of the method for operating a memory system provided by an example of the present disclosure.

FIGS. 9 and 10 are schematic diagrams of the framework flow of the methods for operating a memory system provided by some examples, the method for operating a memory system provided by an example of the present disclosure will be described below in detail with reference to FIGS. 8 to 10.

It should be noted that in the method for operating a memory system provided by the present disclosure, the interface may be the front-end interface 604 of the memory controller 602 shown in FIG. 7.

In some examples, before performing operation S10, the method for operating a memory system further includes: in response to the transmission rate of the link being greater than or equal to 8 GT/s, setting the first error count and the second error count to zero, and starting a timer.

In some examples, as shown in FIG. 9, when the link completes the connection or completes the switch of the rate, operation S1001 is firstly performed to determine whether the transmission rate of the link is greater than or equal to 8 Gt/s; in response to the transmission rate of the link being greater than or equal to 8 GT/s, operations S1002 to S1004 are performed, the initial temperature t0 is updated, the first error count and the second error count are set to zero, and the timer is started.

It should be noted that, as mentioned before, when the transmission rate of the link reaches 8 GT/s and above, the link training and status state machine in the interface may control the hardware in the interface to automatically complete one or more link equalizations, at this time, operation S1002 may be performed to record the temperature of the memory system at which the last link equalization is automatically completed at the link, and this temperature is used as the initial temperature t0. Here, the hardware in the control interface of the link training and status state machine automatically completing link equalization means that the link training and status state machine may automatically perform subsequent switch of states after the link training and status state machine enters the recovery state, and in response to the switch of the link training and status state machine, the hardware in the interface physical layer may perform link equalization. This process does not require software or firmware intervention. When the transmission rate of the link is below 8 GT/s, link equalization may not be performed, in this case, operation S1005 is to be executed to turn off the timer.

In an example of the present disclosure, the first error count is the number of recoverable errors in data packets received by the interface, the recoverable errors here may be errors which are detected by the Link Cyclic Redundancy Check (LCRC) in the Transaction Layer Data packet (TLP) received by the data link layer of the interface; the second error count is the number of times that the interface switches between the normal operating state and the recovery state.

It should be noted that the interface may be divided into Transaction Layer, Data Link Layer and Physical Layer, for the reception process of data packets, the physical layer may assemble the received bit stream into Physical Layer Data packet (PLP), and converts the physical layer data packet into a Data Link Layer Data packet (DLLP) and transmits it to the data link layer, the data link layer data packet includes the transaction layer data packet and link cyclic redundancy check code, the data link layer may perform link cyclic redundancy check on the transaction layer data packet with the link cyclic redundancy check code.

In some examples, the first error count and the second error count may be recorded in the first counter and the second counter of the interface, respectively, and the first error count and the second error count may be obtained from the first counter and the second counter respectively, or the first error count and the second error count may be set to zero.

In some examples, the temperature of the memory system may be obtained through a temperature sensing unit in the memory system, here the temperature sensing unit may include a temperature sensor.

In some examples, when the timer is started and the timing reaches a timing period, operation S10 is performed to determine whether link equalization is to be redone based on the temperature change of the memory system and the error counts of the interface.

In some examples, referring to FIG. 10, the process for performing operation S10 may include: performing operation 2001 to obtain the current temperature t1 of the memory system, and performing operation S2002 to determine whether the absolute value of the difference between the current temperature t1 and the temperature of the memory system at which the link equalization was performed last time is greater than the first preset value. Here, the temperature of the memory system at which the link equalization was performed last time is the initial temperature t0 recorded when operation S1002 is being performed in FIG. 9. In response to the absolute value of the difference between the current temperature t1 and the temperature of the memory system at which the link equalization was performed last time being greater than a first preset value, operation S2003 is performed to obtain the first error count and the second error count; and operation S2004 is performed to determine whether the first error count is greater than a second preset value and whether the second error count is greater than a third preset value.

In the example of the present disclosure, each time the timing of the timer reaches a timing period, operation 2001 is performed to obtain the current temperature of the memory system, i.e., the current temperature of the memory system may be periodically obtained and compared to the temperature of the memory system at which the link equalization was performed last time. If the absolute value of the difference between the current temperature and the temperature of the memory system at which the link equalization was performed last time is greater than the first preset value, it may be considered that the current temperature has changed significantly relative to the temperature of the memory system at which the link equalization was performed last time, this temperature change may cause the equalization coefficient negotiated by both ends of the link of the memory system when the link equalization was performed last time no longer to be applicable, therefore, it is required to further obtain the first error count and the second error count of the interface and to determine whether the first error count is greater than the second preset value and whether the second error count is greater than the third preset value. If the first error count is greater than the second preset value or the second error count being greater than the third preset value, it may be considered that the link is in an unstable state due to a large temperature change, therefore, it may be determined that link equalization is to be redone based on the current temperature to restore the link to a stable operating state.

It should be noted that the present disclosure does not limit the magnitudes of the first preset value, the second preset value and the third preset value, and different configurations may be performed for different memory systems.

In some examples, in response to the first error count being greater than the second preset value or the second error count being greater than the third preset value, the link equalization is determined to be redone, and operation S20 is performed: in response to link equalization being to be redone, triggering the link equalization.

In some examples, referring to FIG. 10, in response to the first error count being greater than the second preset value or the second error count being greater than the third preset value, operation S2005 is performed to request the transmission at the interface to be suspended and wait for the interface to enter the idle state. In one example, after determining that link equalization is to be redone, the interface may be requested to stop generating new data packets, receiving new data packets, and suspending the transmission of generated or received data packets. After the interface enters the idle state, operations S2006 and S2007 are performed to set the flag for performing equalization (Perform Equalization) and trigger link retraining (Link Retrain).

In some examples, the interface includes a control register, the control register includes a bit corresponding to the execution of equalization, and the bit may be flipped, e.g., set to 1 from 0, to set a flag for performing equalization. In addition, the control register also includes a bit corresponding to link retraining, which may be flipped, e.g., set to 1 from 0, to trigger the link training and status state machine to enter the recovery state.

In some examples, in response to a flag for performing equalization, the hardware in the interface may start to perform the link equalization under the control of the link training and status state machine, including sending a training sequence to the host, to notify the host to perform link equalization.

In some examples, the interface sends a training sequence TS2 (Training Sequence 2) to the host, TS2 includes the bit corresponding to a Quiesce Guarantee, the bit is flipped in TS2, e.g., set to 1 from 0, to notify the host to also suspend transmission to ensure that the link is in idle state, TS2 also includes a bit corresponding to Request Equalization, the bit is flipped in TS2, e.g., set to 1 from 0, to notify the host to start to perform the link equalization.

In some examples, continuing to refer to FIG. 10, after performing the link equalization, operation S2008 is performed to set the first error count and the second error count to zero and update the initial temperature t0.

In some examples, when link equalization is successfully completed, i.e., when a new equalization coefficient that enables the link to operate stably is obtained by the negotiation through both ends of the link based on the current temperature t1, the bit corresponding to the Equalization Complete in the state register of the interface may be flipped, e.g., set to 1 from 0, and in response to the bit being set to 1, the first error count and the second error count are set to zero, and the initial temperature t0 is updated to the current temperature t1 obtained through performing operation S2001, that is, when the timer reaches the next timing period and operation S2002 is performed, the temperature of the memory system may be compared with the temperature at which this link equalization is performed, to determine whether to perform operation S2003.

In some examples, the temperature of the memory system at which the link equalization is performed each time may be recorded in a temperature record table, and the latest temperature in the temperature record table may be used as the temperature of the memory system at which the link equalization was performed last time in the example described above, and after link equalization is successfully completed, the current temperature in the example described above will be recorded in the temperature record table. In some other examples, the temperature record table may only include one temperature, which is the temperature of the memory system at which the link equalization was performed last time in the example described above, and after link equalization is successfully completed, the current temperature in the example described above will overwrite the temperature of the memory system at which the link equalization was performed last time.

In some examples, if redoing link equalization fails, that is, within a specified time, the bit error ratio of data received at both ends of the link does not drop below the maximum bit error ratio specified in the protocol, the link training and status state machine may automatically reduce the transmission rate of the link to perform link equalization at a lower rate until a equalization parameter that meets the link stability requirements is obtained.

In an example of the present disclosure, the method for operating a memory system includes determining whether link equalization is to be redone based on a temperature change and error counts of an interface, and triggering link equalization after determining that link equalization is to be redone, that is, the operation of determining whether link equalization is to be redone and triggering link equalization may be autonomously performed, instead of waiting for the host to determine whether the link equalization is to be redone and trigger the link equalization, thereby improving the efficiency of restoring the link to a stable operating state.

Based on the method for operating a memory system described above, the present disclosure further provides a memory system, the memory system includes an interface and an interface controller, the interface is connected to a host through a link; the interface controller is configured to: determine whether link equalization is to be redone based on a temperature change of the memory system and error counts of the interface; the error counts include a first error count and a second error count, and the first error count is the number of recoverable errors in data packets received by the interface, and the second error count is the number of times that the interface switches between a normal operating state and a recovery state; in response to the link equalization being to be redone, trigger the link equalization.

In some examples, the memory system includes a memory device and a memory controller coupled to the memory device and configured to control the memory device; the memory controller includes the interface and the interface controller, or the memory controller includes the interface, and the interface controller is external to the memory controller.

In an example, referring to FIG. 7, the interface of the memory system provided by the present disclosure may be the front-end interface 604 of the memory controller 602 shown in FIG. 7, and the interface controller 615 may be part of the control component 608 of the memory controller 602, and the front-end interface 604 and the interface controller 615 may be coupled by a bus 614 in the memory controller 602.

In another example, the interface controller may also be a control unit in the memory controller 602 that is independent of the control component 608.

In an example of the present disclosure, the interface controller includes firmware and hardware required to run the firmware, and the interface controller may control the interface through running the firmware. The firmware in the interface controller includes a procedure to determine whether link equalization is to be redone and trigger the link equalization. In some examples, the interface includes an interface of high-speed serial computer expansion bus standard, i.e., a PCIe interface, and the memory system may communicate with the host or other PCIe devices according to the PCIe protocol specification.

Figure 11:
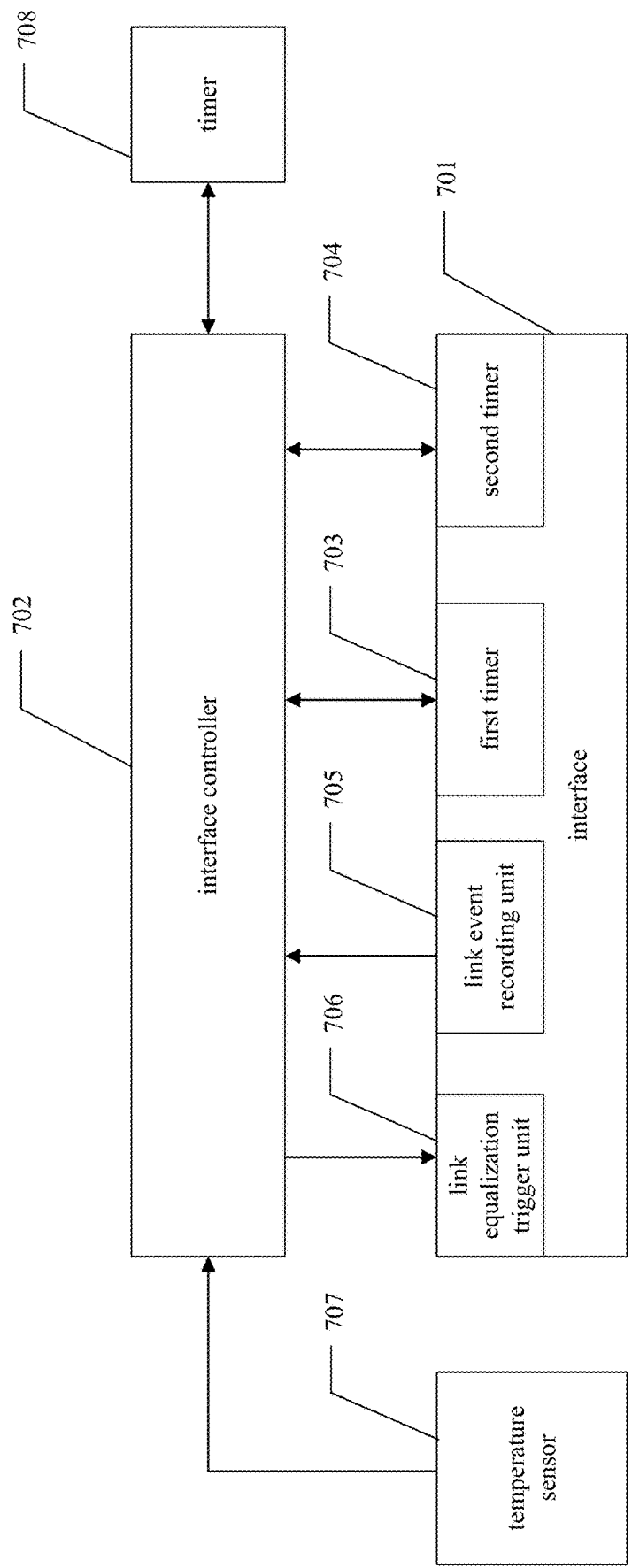
FIG. 11 is a partial schematic diagram of a memory system including an interface and an interface controller provided by an example of the present disclosure.

FIG. 11 is a partial schematic diagram of a memory system provided by an example of the present disclosure, as shown in FIG. 11, the memory system includes an interface 701, an interface controller 702, a temperature sensor 707, and a timer 708, the interface 701 includes a first counter 703, a second counter 704, a link event recording unit 705 and a link equalization triggering unit 706.

In some examples, the interface controller is configured to: obtain the current temperature of the memory system and the temperature of the memory system at which the link equalization was performed last time; in response to the absolute value of the difference between the current temperature and the temperature of the memory system at which the link equalization was performed last time being greater than a first preset value, obtain the first error count and the second error count; in response to the first error count being greater than the second preset value or the second error count being greater than the third preset value, determine that link equalization is to be redone.

In an example, referring to FIG. 11, the interface controller 702 may obtain the current temperature of the memory system through the temperature sensor 707, and in response to the absolute value of the difference between the current temperature and the temperature of the memory system at which the link equalization was performed last time being greater than a first preset value, obtain the first error count and the second error count from the first counter 703 and the second counter 704 respectively.

In some examples, the interface controller is further configured to: in response to the transmission rate of the link being greater than or equal to 8 GT/s, set the first error count and the second error count to zero, and start a timer; obtain the current temperature of the memory system each time the timing of the timer reaches a timing period.

In an example, referring to FIG. 11, the link event recording unit 705 may include a state register, when the connection state or transmission rate of the link changes, the bits related to the connection state or transmission rate of the link in the state register may be flipped, e.g., set to 1 from 0, the interface controller 702 may set the counts in the first counter 703 and the second counter 704 to zero and start the timer 708 in response to the transmission rate of the link being greater than or equal to 8 GT/s. The interface controller 702 may obtain the current temperature of the memory system through the temperature sensor 707 each time the timing of the timer 708 reaches a timing period.

In some examples, the interface controller is further configured to: request the transmission at the interface to be suspended and wait for the interface to enter the idle state before triggering link equalization; set a flag for performing equalization in the control register of the interface after the interface enters the idle state.

In an example, referring to FIG. 11, the interface controller 702, after determining that link equalization is to be redone, may request the interface to stop generating new data packets, receiving new data packets, and suspending the transmission of generated or received data packets. The link equalization trigger unit 706 includes a control register, the interface controller 702 may flip the bit corresponding to the execution of equalization in the control register after the interface enters the idle state, e.g., set to 1 from 0, to set a flag for performing equalization.

In some examples, the interface is configured to: in response to the flag for performing equalization, perform the link equalization, which includes sending a training sequence to the host, to notify the host to perform the link equalization.

In some examples, in response to a flag for performing equalization, the hardware in the interface may start to perform the link equalization under the control of the link training and status state machine, which includes sending a training sequence to the host, to notify the host to perform link equalization.

In some examples, the interface controller is further configured to: set the first error count and the second error count to zero after the link equalization is successfully completed.

In some examples, referring to FIG. 11, when the link equalization is successfully completed, the bit corresponding to the equalization completion in the state register in the interface 701 may be flipped, e.g., set to 1 from 0, in response to the bit position being 1, the interface controller 702 may set the counts in the first counter 703 and the second counter 704 to zero.

Here, reference may be made to the aforementioned introduction of FIGS. 1 to 7 with regard to the structure and composition of the memory system; the interface controller is configured to perform the method shown in FIGS. 8 to 10, the execution process of which has been described in detail in the method for operating a memory system in the aforementioned example, and will not be repeated here.

In an example of the present disclosure, the interface controller may determine whether link equalization is to be redone based on a temperature change and error counts of the interface, and the interface provides the interface controller with a port that triggers link equalization, in one example, the interface controller may set the bits related to triggering link equalization in the control register in the interface, so that link equalization may be triggered after determining that link equalization is to be redone, such that the memory system may autonomously determine whether link equalization is to be redone and trigger link equalization, instead of waiting for the host to determine whether the link equalization is to be redone and trigger the link equalization, thereby improving the efficiency of restoring the link to a stable operating state.

Based on similarities to the memory system and operating method thereof described above, the present disclosure also provides a system and operating method thereof. FIG. 7 is a schematic diagram of a system provided by an example of the present disclosure, FIG. 12 is a schematic flowchart of an implementation of a method for operating a system provided by an example of the present disclosure.

In some examples, referring to FIG. 7, the system includes a host 606 and a memory system 601; the memory system 601 includes a front-end interface 604 and an interface controller 615, the host 606 includes a host interface 607, the front-end interface 604 and the host interface 607 are connected through a link 605. The interface controller 615 is configured to: determine whether link equalization is to be redone based on a temperature change of the memory system and error counts of the front-end interface 604; the error counts include a first error count and a second error count, and the first error count is the number of recoverable errors in data packets received by the front-end interface 604, and the second error count is the number of times that the front-end interface 604 switches between a normal operating state and a recovery state; in response to determining that link equalization is to be redone, trigger the link equalization; the front-end interface 604 is configured to: perform the link equalization, which includes sending a training sequence to the host interface 607, to notify the host interface 607 to perform the link equalization; the host interface 607 is configured to: receive the training sequence and perform the link equalization.

In some examples, each of the front-end interface 604 and the host interface 607 includes an interface of high-speed serial computer expansion bus standard, i.e., PCIe interface, the memory system 601 and the host 606 may communicate according to the PCIe protocol specification through the front-end interface 604 and the host interface 607.

Figure 12:
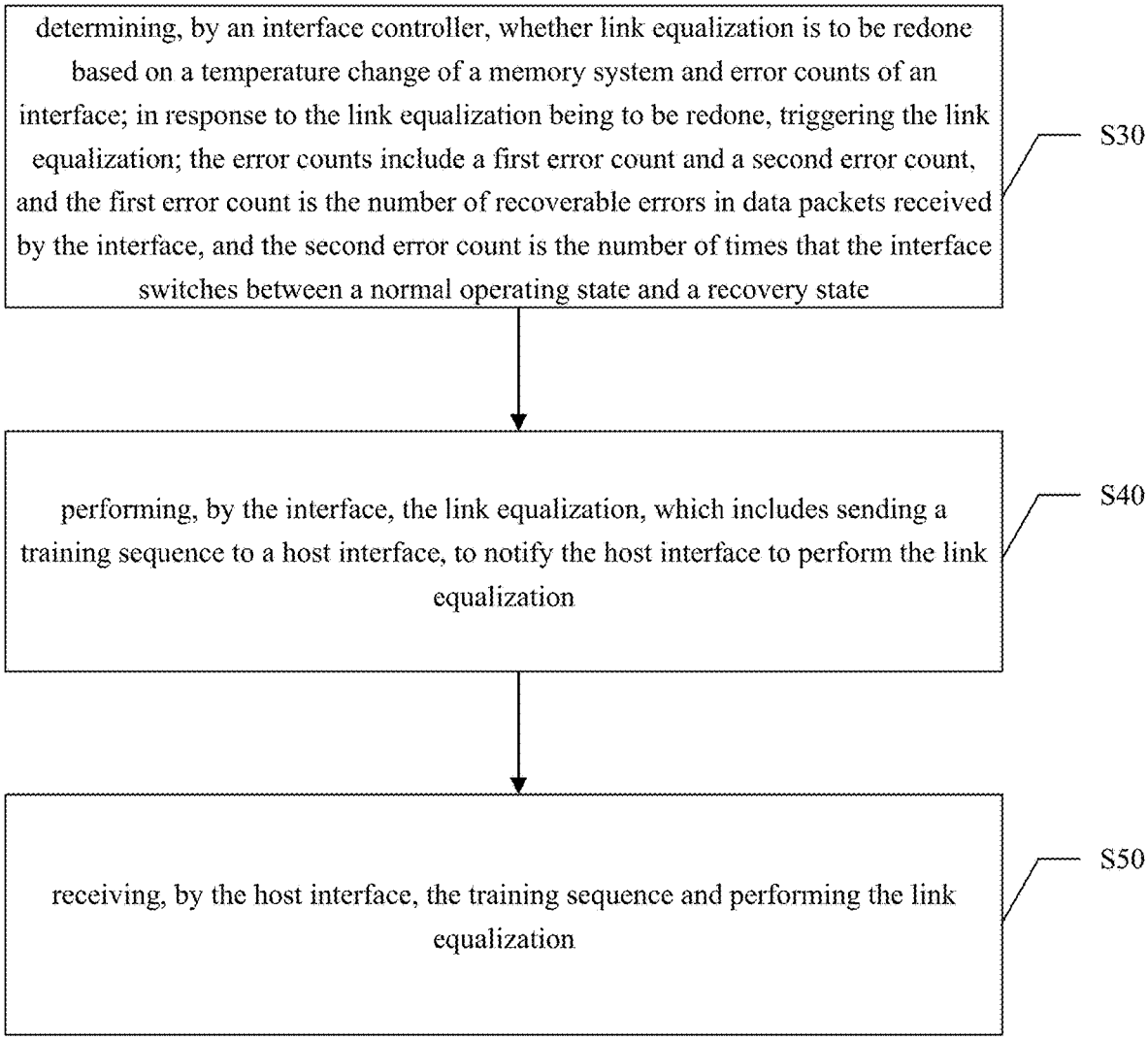
FIG. 12 is a schematic flowchart of an implementation of a method for operating a system provided by an example of the present disclosure.

In some examples, as shown in FIG. 12, the method for operating a system includes the following operations:

Operation S30: determining, by an interface controller, whether link equalization is to be redone based on a temperature change of a memory system and error counts of an interface; in response to the link equalization being to be redone, triggering the link equalization; the error counts include a first error count and a second error count, and the first error count is the number of recoverable errors in data packets received by the interface, and the second error count is the number of times that the interface switches between a normal operating state and a recovery state;

Operation S40: performing, by the interface, the link equalization, which includes sending a training sequence to a host interface, to notify the host interface to perform the link equalization;

Operation S50: receiving, by the host interface, the training sequence and performing the link equalization.

Here, the interface in the method for operating a system may be the front-end interface 604 of the memory controller 602 shown in FIG. 7.

In some examples, the bits in the training sequence sent by the interface to the host corresponding to the Quiesce Guarantee and Request Equalization may be flipped, e.g., set to 1 from 0; and after the host interface receives the training sequence, in response to the bit corresponding to the Quiesce Guarantee in the training sequence being 1, transmission may be suspended to ensure that the host interface is in an idle state; and in response to the bit corresponding to the requested equalization being 1, the host interface may start to perform the link equalization.

In some examples, the process of performing the link equalization includes: the interface and the host interface interacting with the training sequence, and adjusting their respective sending parameters and receiving parameters to reduce the bit error ratio of data received at both ends of the link to be below the maximum bit error ratio specified by the protocol (e.g., 10E-12).

In an example of the present disclosure, the interface and the host interface are connected through a link, and the interface controller in the memory system may determine whether link equalization is to be redone based on the temperature change of the memory system and error counts of the interface, and trigger link equalization when link equalization is determined to be redone, that is, if the equalization coefficient negotiated by both ends of the link when the link equalization was performed last time is no longer applicable due to change of link temperature, which causes the error count of the interface to increase and the link to be in an unstable state, the memory system may autonomously determine whether link equalization is to be redone and trigger link equalization, thereby releasing the computing resources of the host, and improving system performance.

The present disclosure also provides a computer-readable storage medium having a computer program stored thereon.

In some examples, the computer program, when executed by the processor, may perform the method for operating a memory system in any of the examples described above.

In some other examples, the computer program, when executed by the processor, may perform the method for operating a system in any of the examples described above.

Here, in order to implement all or part of the processes in the methods in the examples described above, this may be accomplished through computer program instructions related to hardware, the computer program may be stored in a computer-readable storage medium, and the execution of the computer program may include the process of the method in any of the examples described above. Wherein computer-readable storage medium may be a magnetic disk, optical disk, read-only memory (ROM), Random Access Memory (RAM), Flash Memory, Hard Disk Drive (HDD) or solid state drive, etc., the computer-readable storage medium may also include a combination of the storage medium described above.

In view of this, examples of the present disclosure provide a memory system and operating method thereof, a system and operating method thereof, and computer-readable storage medium to solve at least one problem existing in the prior art.

In order to achieve the purpose described above, a technical solution of an example of the present disclosure is implemented as follows:

In a first aspect, an example of the present disclosure provides a memory system, the memory system includes an interface and an interface controller, the interface is connected to a host through a link; the interface controller is configured to:

determine whether link equalization is redone based on a temperature change of the memory system and the error counts of the interface; the error counts includes a first error count and a second error count, and the first error count is the number of recoverable errors in data packets received by the interface, and the second error count is the number of times that the interface switches between a normal operating state and a recovery state;

in response to the link equalization being to be redone, trigger the link equalization.

In an implementation, the interface controller is configured to:

obtain the current temperature of the memory system and the temperature of the memory system at which the link equalization was performed last time;

in response to the absolute value of the difference between the current temperature and the temperature of the memory system at which the link equalization was performed last time being greater than a first preset value, obtain the first error count and the second error count;

in response to the first error count being greater than a second preset value or the second error count being greater than a third preset value, determine that the link equalization is to be redone.

In an implementation, the interface controller is further configured to:

in response to the transmission rate of the link being greater than or equal to 8 GT/s, set the first error count and the second error count to zero, and start a timer;

obtain the current temperature of the memory system each time the timing of the timer reaches a timing period.

In an implementation, the interface controller is further configured to:

set the first error count and the second error count to zero after the link equalization is successful.

In an implementation, the interface controller is further configured to:

request the transmission at the interface to be suspended and wait for the interface to enter an idle state before triggering the link equalization;

set a flag for performing equalization in a control register of the interface after the interface enters the idle state.

In an implementation, the interface is further configured to:

in response to the flag for performing equalization, perform the link equalization, which includes sending a training sequence to the host to notify the host to perform the link equalization.

In an implementation, the memory system includes a memory device and a memory controller coupled to the memory device and configured to control the memory device; the memory controller includes the interface and the interface controller, or the memory controller includes the interface, and the interface controller is external to the memory controller.

In an implementation, the interface includes an interface of high-speed serial computer expansion bus standard.

In a second aspect, an example of the present disclosure provides a method for operating a memory system, including:
  determining whether a link equalization is to be redone based on a temperature change of the memory system and error counts of an interface; the error counts include a first error count and a second error count, and the first error count is the number of recoverable errors in data packets received by the interface, and the second error count is the number of times that the interface switches between a normal operating state and a recovery state;
  in response to the link equalization being to be redone, triggering the link equalization.

In an implementation, the determining whether a link equalization is to be redone based on a temperature change of the memory system and error counts of an interface includes:
  obtaining the current temperature of the memory system and the temperature of the memory system at which the link equalization was performed last time;
  in response to the absolute value of the difference between the current temperature and the temperature of the memory system at which the link equalization was performed last time being greater than a first preset value, obtaining the first error count and the second error count;
  in response to the first error count being greater than a second preset value or the second error count being greater than a third preset value, determining that the link equalization is to be redone.

In an implementation, the method further includes:
  in response to the transmission rate of the link being greater than or equal to 8 GT/s, setting the first error count and the second error count to zero, and start a timer;
  obtaining the current temperature of the memory system each time the timing of the timer reaches a timing period.

In an implementation, the method further includes:
  setting the first error count and the second error count to zero after the link equalization is successful.

In an implementation, the method further includes:
  requesting the transmission at the interface to be suspended and waiting for the interface to enter an idle state before triggering the link equalization;
  the triggering the link equalization includes:
  setting a flag for performing equalization in a control register of the interface after the interface enters the idle state.

In an implementation, the method further includes:
  in response to the flag for performing equalization, performing the link equalization, which includes sending a training sequence to a host to notify the host to perform the link equalization.

In a third aspect, an example of the present disclosure provides a system, the system includes a host and a memory system; the memory system includes an interface and an interface controller, the host includes a host interface, and the interface and the host interface are connected through a link;
  the interface controller is configured to: determine whether a link equalization is to be redone based on a temperature change of the memory system and error counts of the interface; the error counts include a first error count and a second error count, and the first error count is the number of recoverable errors in data packets received by the interface, and the second error count is the number of times that the interface switches between a normal operating state and a recovery state;
  in response to determining that the link equalization is to be redone, trigger the link equalization;
  the interface is configured to: perform the link equalization, which includes sending a training sequence to the host interface, to notify the host interface to perform the link equalization.
  the host interface is configured to: receive the training sequence and perform the link equalization.

In an implementation, the interface controller is configured to:
  obtain the current temperature of the memory system and the temperature of the memory system at which the link equalization was performed last time;
  in response to the absolute value of the difference between the current temperature and the temperature of the memory system at which the link equalization was performed last time being greater than a first preset value, obtain the first error count and the second error count;
  in response to the first error count being greater than a second preset value or the second error count being greater than a third preset value, determine that the link equalization is to be redone.

In an implementation, the interface controller is further configured to:
  in response to the transmission rate of the link being greater than or equal to 8 GT/s, set the first error count and the second error count to zero, and start a timer;
  obtain the current temperature of the memory system each time the timing of the timer reaches a timing period.

In an implementation, each of the interface and the host interface includes an interface of high-speed serial computer expansion bus standard.

In a fourth aspect, an example of the present disclosure provides a method for operating a system, including:
  determining, by an interface controller, whether a link equalization is to be redone based on a temperature change of a memory system and error counts of an interface; in response to the link equalization being to be redone, triggering the link equalization; the error counts include a first error count and a second error count, and the first error count is the number of recoverable errors in data packets received by the interface, and the second error count is the number of times that the interface switches between a normal operating state and a recovery state;
  performing, by the interface, the link equalization, which includes sending a training sequence to a host interface, to notify the host interface to perform the link equalization;
  receiving, by the host interface, the training sequence and performing the link equalization.

In an implementation, the determining whether a link equalization is to be redone based on a temperature change of a memory system and error counts of an interface includes:
  obtaining the current temperature of the memory system and the temperature of the memory system at which the link equalization was performed last time;
  in response to the absolute value of the difference between the current temperature and the temperature of the memory system at which the link equalization was performed last time being greater than a first preset value, obtaining the first error count and the second error count;
  in response to the first error count being greater than a second preset value or the second error count being greater than a third preset value, determining that the link equalization is to be redone.

In an implementation, the method further includes:
  in response to the transmission rate of the link being greater than or equal to 8 GT/s, setting, by the interface controller, the first error count and the second error count to zero, and start a timer;
  obtaining, by the interface controller, the current temperature of the memory system each time the timing of the timer reaches a timing period.

In a fifth aspect, an example of the present disclosure provides a computer-readable storage medium, the computer-readable storage medium stores a computer program that when executed, may implement the method for operating a memory system or the method for operating a system of any one of the technical schemes described above.

In the technical solution provided by the present disclosure, the interface controller in the memory system is configured to determine whether the link equalization is to be redone based on a temperature change of the memory system and error counts of an interface, and trigger the link equalization when the link equalization is determined to be redone, that is, when the equalization coefficient negotiated by both ends of the link during the last link equalization is no longer applicable due to change of link temperature, causing the error count of the interface to increase and the link to be in an unstable state, the memory system may autonomously determine whether the link equalization is to be redone and trigger link equalization instead of waiting for the host to determine whether the link equalization is to be redone and trigger link equalization, thereby improving the efficiency of restoring the link to a stable operating state, releasing the computing resources of the host, and improving the overall performance of the system.

The methods disclosed in several method examples provided in the present disclosure may be combined arbitrarily without conflicts to obtain new method examples.

The features disclosed in several apparatus examples provided in the present disclosure may be combined arbitrarily without conflicts to obtain new apparatus examples.

The above is only implementation of the present disclosure, but the claimed scope of the present disclosure is not limited thereto, and changes or substitutions within the technical scope disclosed in the present disclosure that may be easily conceived by those skilled in the art shall fall within the claimed scope of the present disclosure.

What is claimed is:

1. A memory system, comprising:
  an interface connected to a host through a link; and
  an interface controller, configured to:
    determine whether a link equalization is to be redone based on a temperature change of the memory system and error counts of the interface, wherein the error counts include a first error count and a second error count, the first error count is a number of recoverable errors in data packets received by the interface, and the second error count is a number of times that the interface switches between a normal operating state and a recovery state, and wherein to determine whether the link equalization is to be redone comprises to:
      obtain a current temperature of the memory system and a temperature of the memory system at which the link equalization was performed last time;
      in response to an absolute value of a difference between the current temperature and the temperature of the memory system at which the link equalization was performed last time being greater than a first preset value, obtain the first error count and the second error count; and
      in response to the first error count being greater than a second preset value or the second error count being greater than a third preset value, determine that the link equalization is to be redone; and
    in response to a determination the link equalization is to be redone, trigger the link equalization.

2. The memory system of claim 1, wherein the interface controller is further configured to:
  in response to a transmission rate of the link being greater than or equal to 8 GT/s, set the first error count and the second error count to zero, and start a timer; and
  obtain the current temperature of the memory system each time a timing of the timer reaches a timing period.

3. The memory system of claim 1, wherein the interface controller is further configured to set the first error count and the second error count to zero after the link equalization is successful.

4. The memory system of claim 1, wherein the interface controller is further configured to:
  request a transmission at the interface to be suspended and wait for the interface to enter an idle state before triggering the link equalization; and
  set a flag indicating performing the link equalization in a control register of the interface after the interface enters the idle state.

5. The memory system of claim 4, wherein the interface is configured to, in response to the flag indicating performing the link equalization, perform the link equalization, which includes sending a training sequence to the host to notify the host to perform the link equalization.

6. The memory system of claim 1, wherein the memory system further includes a memory device and a memory controller coupled to the memory device and is configured to control the memory device, wherein:
  the memory controller includes the interface and the interface controller, or
  the memory controller includes the interface, and the interface controller is external to the memory controller.

7. The memory system of claim 1, wherein the interface includes an interface of high-speed serial computer expansion bus standard.

8. A computer-readable storage medium, wherein the computer-readable storage medium stores computer program that when executed, may implement a method for operating a memory system, comprising:
  determining whether a link equalization is to be redone based on a temperature change of the memory system and error counts of an interface, wherein the error counts include a first error count and a second error count, the first error count is a number of recoverable errors in data packets received by the interface, and the second error count is a number of times that the interface switches between a normal operating state and a recovery state, and wherein determining whether the link equalization is to be redone comprises:

obtaining a current temperature of the memory system and a temperature of the memory system at which the link equalization was performed last time;

in response to an absolute value of a difference between the current temperature and the temperature of the memory system at which the link equalization was performed last time being greater than a first preset value, obtaining the first error count and the second error count; and in response to the first error count being greater than a second preset value or the second error count being greater than a third preset value, determining that the link equalization is to be redone; and in response to a determination the link equalization is to be redone, triggering the link equalization.

9. The computer-readable storage medium of claim 8, wherein the method for operating the memory system further includes:

in response to a transmission rate of a link being greater than or equal to 8 GT/s, setting the first error count and the second error count to zero, and starting a timer; and obtaining the current temperature of the memory system each time a timing of the timer reaches a timing period.

10. The computer-readable storage medium of claim 8, wherein the method for operating the memory system further includes setting the first error count and the second error count to zero after the link equalization is successful.

11. The computer-readable storage medium of claim 8, wherein the method for operating the memory system further includes requesting a transmission at the interface to be suspended and waiting for the interface to enter an idle state before triggering the link equalization, wherein the triggering the link equalization includes setting a flag indicating performing the link equalization in a control register of the interface after the interface enters the idle state.

12. The computer-readable storage medium of claim 11, wherein the method for operating the memory system further includes, in response to the flag indicating performing the link equalization, performing the link equalization, which includes sending a training sequence to a host to notify the host to perform the link equalization.

13. The computer-readable storage medium of claim 8, wherein the interface includes an interface of high-speed computer expansion bus standard.

14. The computer-readable storage medium of claim 8, wherein the memory system further includes a memory device and a memory controller coupled to the memory device and is configured to control the memory device, wherein:

the memory controller includes the interface and an interface controller, or the memory controller includes the interface, and the interface controller is external to the memory controller.

15. A method of operating a memory system, comprising:
determining whether a link equalization is to be redone based on a temperature change of the memory system and error counts of an interface, wherein the error counts include a first error count and a second error count, the first error count is a number of recoverable errors in data packets received by the interface, and the second error count is a number of times that the interface switches between a normal operating state and a recovery state, and wherein determining whether the link equalization is to be redone comprises:

obtaining a current temperature of the memory system and a temperature of the memory system at which the link equalization was performed last time;

in response to an absolute value of a difference between the current temperature and the temperature of the memory system at which the link equalization was performed last time being greater than a first preset value, obtaining the first error count and the second error count; and in response to the first error count being greater than a second preset value or the second error count being greater than a third preset value, determining that the link equalization is to be redone; and in response to a determination the link equalization is to be redone, triggering the link equalization.

16. The method of claim 15, further including:
in response to a transmission rate of a link being greater than or equal to 8 GT/s, setting the first error count and the second error count to zero, and starting a timer; and obtaining the current temperature of the memory system each time a timing of the timer reaches a timing period.

17. The method of claim 15, further including setting the first error count and the second error count to zero after the link equalization is successful.

18. The method of claim 15, further including requesting a transmission at the interface to be suspended and waiting for the interface to enter an idle state before triggering the link equalization, wherein the triggering the link equalization includes setting a flag indicating performing the link equalization in a control register of the interface after the interface enters the idle state.

19. The method of claim 18, further including, in response to the flag indicating performing the link equalization, performing the link equalization, which includes sending a training sequence to a host to notify the host to perform the link equalization.

20. The method of claim 15, wherein the interface includes an interface of high-speed computer expansion bus standard.

* * * * *